V. MIKULECKY.
ANTISKID CHAIN FOR WHEEL TIRES.
APPLICATION FILED NOV. 29, 1919.
1,357,334. Patented Nov. 2, 1920.
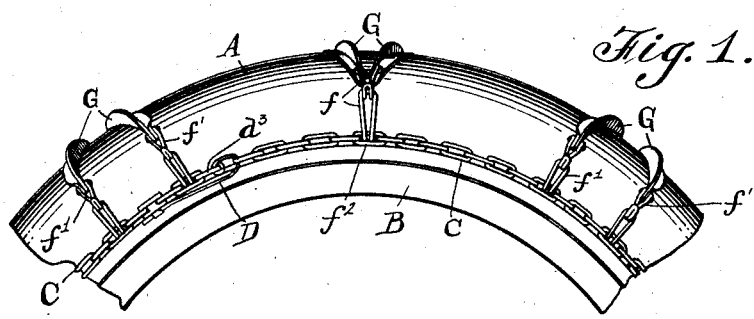
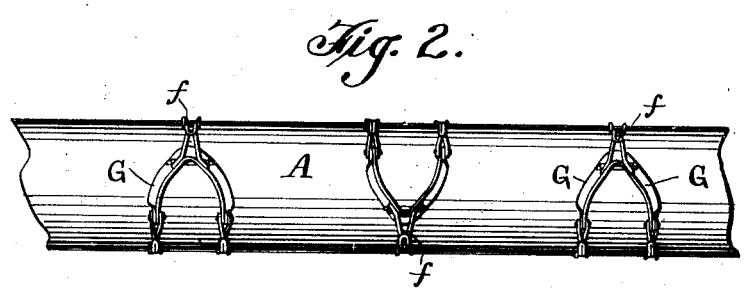
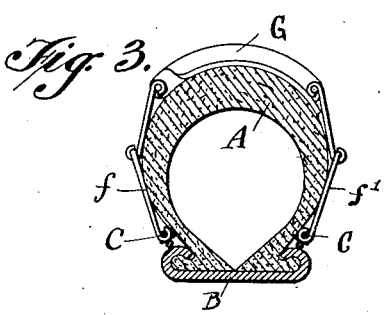
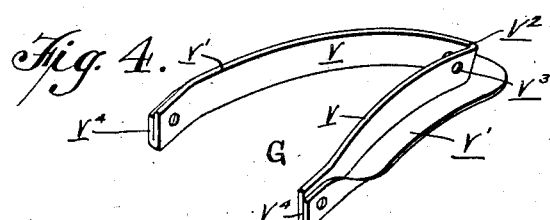
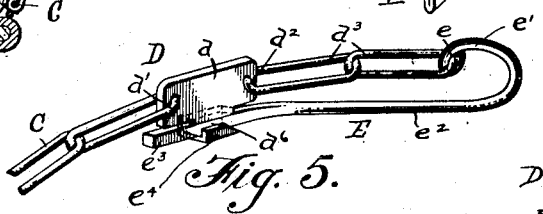
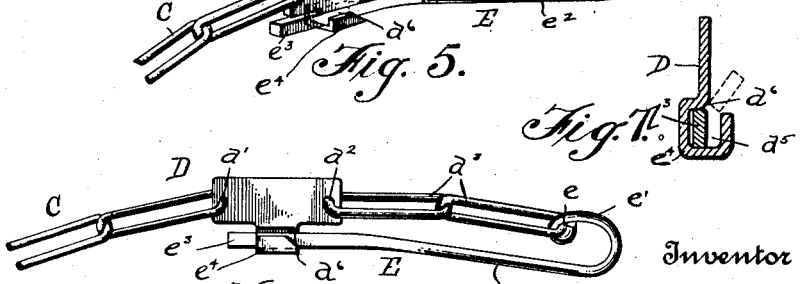
Inventor
Vaclav Mikulecky
By his Attorneys
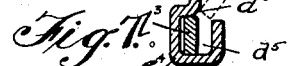

UNITED STATES PATENT OFFICE.

VACLAV MIKULECKY, OF VERDIGRE, NEBRASKA.

ANTISKID-CHAIN FOR WHEEL-TIRES.

1,357,334.  Specification of Letters Patent.  Patented Nov. 2, 1920.

Application filed November 29, 1919. Serial No. 341,440.

*To all whom it may concern:*

Be it known that I, VACLAV MIKULECKY, a citizen of the United States, residing in Verdigre, in the county of Knox and State of Nebraska, have invented certain new and useful Improvements in Antiskid-Chains for Wheel-Tires, of which the following is a specification.

This invention relates to anti-skid devices for wheel tires in which longitudinal chains on opposite sides of the tires are connected to tread pieces arranged on the tread portions of the tires.

According to my invention, I provide tread pieces of novel construction which are interposed between the longitudinal chains and are connected therewith by short links or chains in the manner hereinafter described.

In the accompanying drawings:—

Figure 1 shows a portion of an automobile wheel tire equipped with anti-skid devices constructed in accordance with my invention.

Fig. 2 is a plan view of the same.

Fig. 3 is a cross sectional view.

Fig. 4 is a perspective view of one of the tread pieces.

Fig. 5 is a perspective view illustrating, on an enlarged scale, devices preferably employed for connecting the ends of the longitudinal chains.

Fig. 6 shows a side elevation of the same.

Fig. 7 is a cross sectional view of the locking devices.

A portion of a pneumatic wheel tire is shown at A, and a wheel rim at B. Longitudinal chains C of usual construction are applied in the usual way to the tire and the opposite end of the chains are preferably connected by the fastening devices D.

As shown, each fastening device comprises a plate $d$ to which one end of the chain C is pivotally connected at $d'$. At its opposite end the plate is pivotally connected at $d^2$ to a short length of chain $d^3$, to the outer end of which is pivotally connected at $e$ a rod E, having a looped portion $e'$ and an arm $e^2$ having a flattened end portion $e^3$, adapted to engage a socket piece $e^4$ on the plate $d$. The socket piece is formed integrally with the plate and is of the shape shown in cross section in Fig. 7. It has a chamber $d^5$ to receive the end of the arm $e^2$ and an opening $d^6$ to permit the insertion and withdrawal of the arm. As shown, the size of the opening is such as to permit the flattened end of the arm to be inserted when turned to the position shown in dotted lines in Fig. 7, but when the arm is seated in the chamber $d^5$ and turned to the position shown it cannot leave the chamber. When connecting the ends of the chain the arm is inserted through the end link of the chain C; then the arm is turned about its hinge connection at $e$ in such manner as to draw the end of the chain with which it is connected toward the end of the chain on the opposite side of the locking devices; then the flattened end portion of the arm is inserted through the opening $d^6$, in the manner indicated by dotted lines in Fig. 7, and when the arm has entered the chamber $d^5$ it is released and then the strain on the chain will hold the arm in the position shown, thus securely connecting the ends of the chain and the strain of the chain is such as to prevent the arm from being turned or from leaving the locking chamber. The drawings show how the locking devices are applied to a chain on one side of the tire; similar locking devices are employed on the opposite side.

I provide tread pieces G, of novel construction, and connect them with the longitudinal chains by short lengths of chains or links. Each of the tread pieces, as shown in Fig. 4, is V-shaped, the side arms $v$ being formed with flanges $v'$ at their bases, which flanges extend around the apex $v^4$ of the V, which is perforated at $v^3$. The ends of the arms $v$ are turned inward toward each other and are substantially parallel, being perforated at $v^4$, as shown, for a purpose hereinafter described.

Each tire piece is curved on its under side both longitudinally and transversely to conform to the shape of the tire to which it is applied so that it lies smoothly and evenly thereon. The apex of each tread member carries a short length of chain $f$, the inner end of which is pivotally connected to the tread member and the outer end of which is connected to one of the longitudinal chains, as indicated at $f^2$, Fig. 1. It will be observed that the chain $f$ extends over and rests upon the flange which projects from the apex of the tread piece. In this way the tire is to some extent protected inasmuch as the chain $f$ does not rest on the tire where it joins the tread piece or immediately in front thereof. The ends of the arms $v$ carry short lengths of chain or links $f'$ which are connected to the longitudinal chain on the opposite side of the tire. When the tread piece lies close to the fastening devices D one of the chains $f'$ is connected to the chain C (Fig. 1), while the other chain $f'$ is connected to the short length of chain $d^3$. It will be understood that the tread pieces and the links or chains are connected to the longitudinal chains before the anti-skid device is applied to the tire. When thus applied, the tread pieces and chains are symmetrically arranged and the fastening devices are operated in the manner before described to tightly hold the device on the tire. Preferably the V-shaped tread pieces are arranged in the manner indicated in Fig. 2, the apexes of the V's alternately pointing in different directions.

The construction is such that the tread members, while not unduly heavy, are strong and durable. The flanges $v'$ provide an extended bearing surface so that the tread is not cut by the metal. These flanges also serve to strengthen the device as a whole. The arms of the V being arranged diagonally across the tread effectually prevent skidding in either direction but do not interfere with the straight or onward progress of the wheel.

I claim as my invention:

An anti-skid device for wheel tires, comprising two longitudinal chains and a series of V-shaped tread pieces, each of which has a flange extending outward from the base of its two sides and also extending outward from its front portion, links connecting the rear ends of each tread piece to one of the chains, and links connected to the other chain extending over and resting on the flange at the front of the tread piece and connected to the apex of said front piece.

In testimony whereof, I have hereunto subscribed my name.

VACLAV MIKULECKY.